United States Patent
Lee (10) Patent No.: US 7,770,976 B2
(45) Date of Patent: Aug. 10, 2010

(54) MULTI-FUNCTIONAL AUXILIARY HEADREST

(76) Inventor: Mei-Huei Lee, 4F., No. 30, Alley 24, Lane 91, Sec. 1, Neihu Rd., Neihu Dist., Taipei (TW)

( * ) Notice: Subject to any disclaimer, the term of this patent is extended or adjusted under 35 U.S.C. 154(b) by 471 days.

(21) Appl. No.: 11/746,070

(22) Filed: May 9, 2007

(65) Prior Publication Data

US 2008/0036253 A1 Feb. 14, 2008

(30) Foreign Application Priority Data

May 19, 2006 (TW) .............................. 95208583 U (51) Int. Cl.
*B60N 2/48* (2006.01)

(52) U.S. Cl. ...................................... 297/397

(58) Field of Classification Search ................ 297/397, 297/410; 5/636, 639, 640, 653
See application file for complete search history.

(56) References Cited

U.S. PATENT DOCUMENTS

| | | | | |
|---|---|---|---|---|
| 3,608,964 A | * | 9/1971 | Earl | 297/397 |
| 5,015,036 A | * | 5/1991 | Fergie | 297/397 |
| 5,154,477 A | * | 10/1992 | Lacy | 297/397 |
| 5,345,633 A | * | 9/1994 | Harnish | 5/639 |
| 5,613,736 A | * | 3/1997 | Schaked et al. | 297/397 |
| 5,964,504 A | * | 10/1999 | Hogan et al. | 297/397 |
| 6,394,554 B1 | * | 5/2002 | Hingle | 297/482 |
| 6,782,572 B1 | * | 8/2004 | Jones | 5/640 |
| D564,807 S | * | 3/2008 | Da Re | D6/501 |

* cited by examiner

*Primary Examiner*—Peter R. Brown
(74) *Attorney, Agent, or Firm*—Leong C. Lei (57) ABSTRACT

A multi-functional auxiliary headrest for car seat is disclosed. The auxiliary headrest comprises a body mounted with a suspension strap at the rear side of the seat and one side of suspension strap being stitched and the other side having a male Velcro fastener, and the center of the suspension strap being a female Velcro, characterized in that the auxiliary headrest is provided with a securing strap or a securing strap stitched onto a seat cover, and the securing strap is positioned at the suspension strap at the back of the auxiliary headrest, and the securing strap and the seat cover are secured to the headrest at the car seat, the suspension strap of the auxiliary headrest passes through the securing strap such that the male Velcro can be freely mounted to adapt to the physical size of the driver.

1 Claim, 10 Drawing Sheets

MULTI-FUNCTIONAL AUXILIARY HEADREST

BACKGROUND OF THE INVENTION (a) Technical Field of the Invention

The present invention relates to auxiliary headrest structure, and in particular an auxiliary headrest having one or more than one suspension strap at the rear side of the auxiliary headrest to hold at least one securing strap or a seat cover such that the auxiliary headrest is slidably at the securing strap.

(b) Description of the Prior Art

The seat structure of a vehicle is generally consisting of a headrest and a seat back, and the headrest and the seat back are combined with each other such that the headrest can be adjusted upward or downward to provide an appropriate height comfortably fit the driver. However, than is a gap formed between the headrest and the seat back, and accordingly, to solve this problem, the inventor has ever designed an auxiliary headrest which could be mounted at the seat back and minimize the gap. The mounting of the auxiliary headrest is by means of Velcro fasteners. In order to suit driver of different height, the height, of the auxiliary headrest is adjusted, however, the distance for adjustment is limited, and therefore the drawback of the gap is still not fully resolved.

Due to differences in heights of the drivers, the head position of the drivers on the headrest of the car seat is different among drivers of different physical heights, and the position of the gap to the driver is also different. Whenever, the seat is extended to allow the driver to have a nap, the head position of the driver has to be adjusted to allow the head to be comfortably place onto the headrest.

SUMMARY OF THE INVENTION

The primary purpose of the present invention is to provide an auxiliary headrest for car seat having a body mounted with a suspension strap at the rear side of the seat and one side of suspension strap being stitched and the other side having a male Velcro fastener, and the center of the suspension strap being a female Velcro, characterized in that the auxiliary headrest is provided with a securing strap or a securing strap stitched onto a seat cover, and the securing strap is positioned at the suspension strap at the back of the auxiliary headrest, and the securing strap and the seat cover are secured to the headrest of the car seat, the suspension strap of the auxiliary headrest passes through the securing strap such that the male Velcro can be freely mounted to adapt to drivers of different physical sizes.

It is still another object of the present invention to provide a multi-functional auxiliary headrest, wherein the suspension strap at the rear face of the auxiliary headrest is a button fastener.

Yet still another object of the present invention to provide a multi-functional auxiliary headrest, wherein the securing strap is directly mounted onto the auxiliary headrest and the securing strap rotates about the headrest of the vehicle seat.

Another yet a further object is to provide a multi-functional auxiliary headrest, wherein the auxiliary headrest is provided with a female Velcro fastener which could be directly connected to the vehicle seat together with the securing strap having a male Velcro.

Yet a further object of the present invention is to provide a multi-functional auxiliary headrest, wherein the strap of the auxiliary headrest is secured at the strap using a securing strap.

Still a further object of the present invention is to provide a multi-functional auxiliary headrest, wherein the securing strap is secured by stitching together with the headrest cover, and the securing strap is first mounted below the strap and the securing strap is then stitched onto the headrest.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
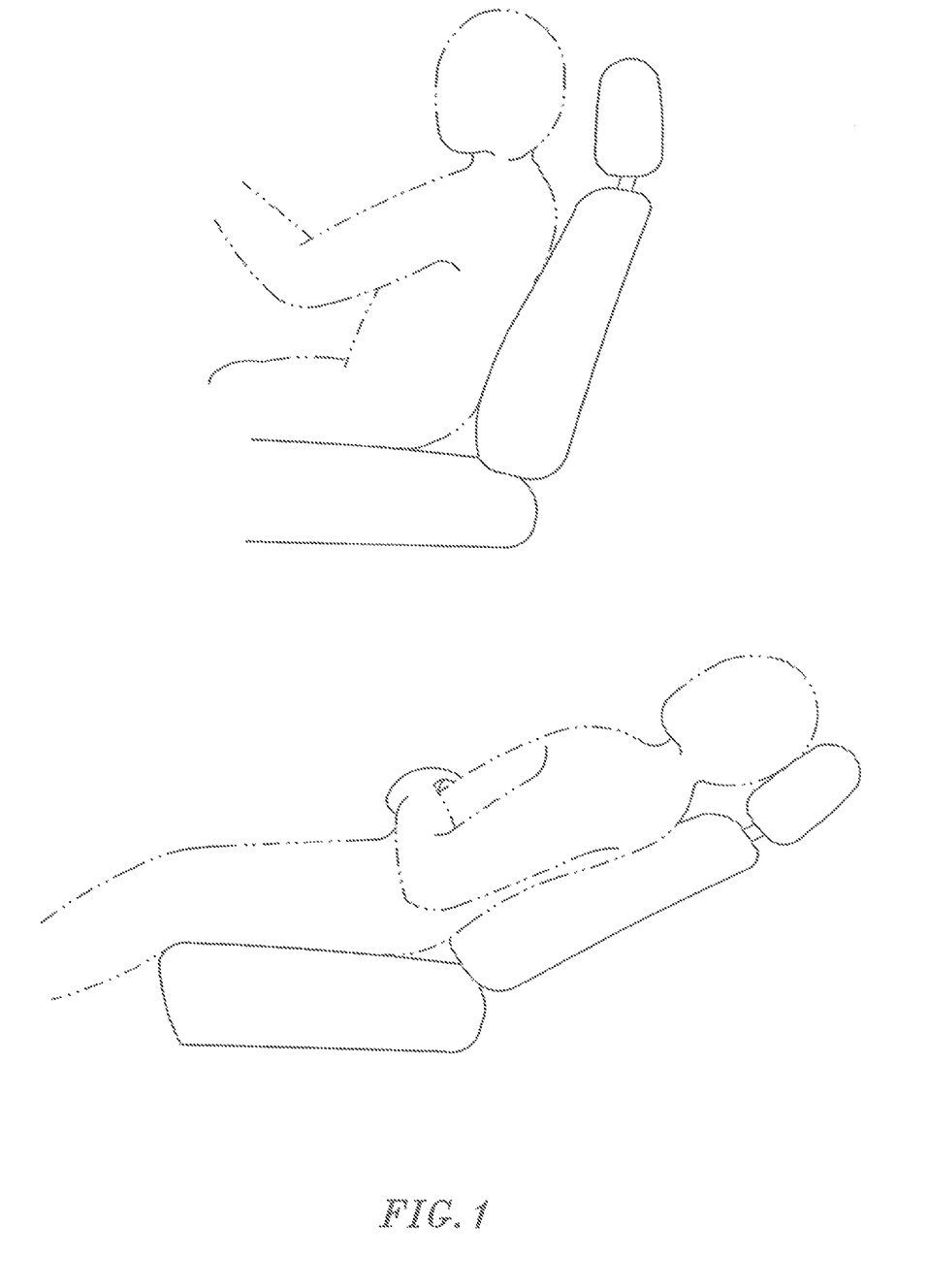
FIG. 1 is a schematic view of a conventional auxiliary headrest structure.
Figure 2:
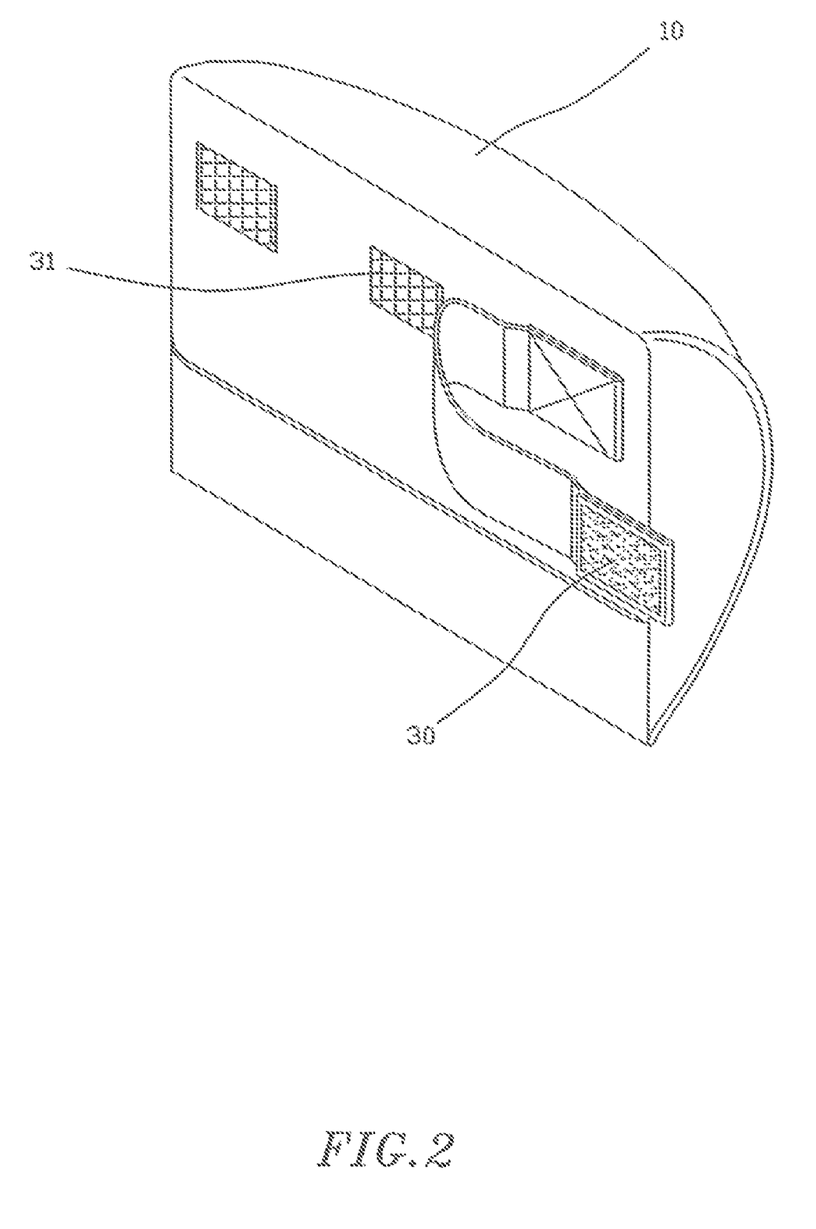
FIG. 2 is a schematic view of a multi-functional auxiliary headrest in accordance with the present invention.
Figure 3:
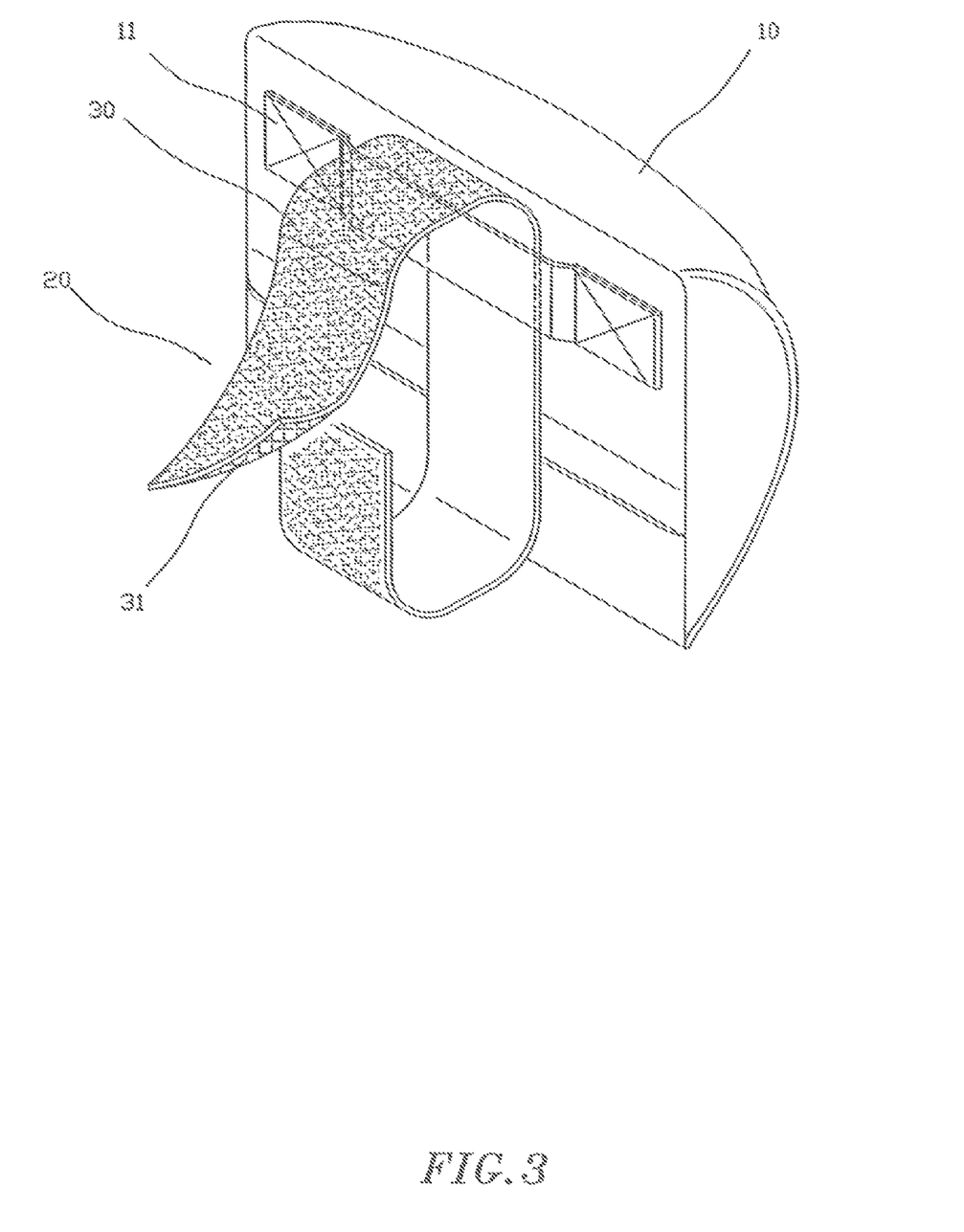
FIG. 3 is another schematic view of a multi-functional auxiliary headrest in accordance with the present invention.
Figure 4:
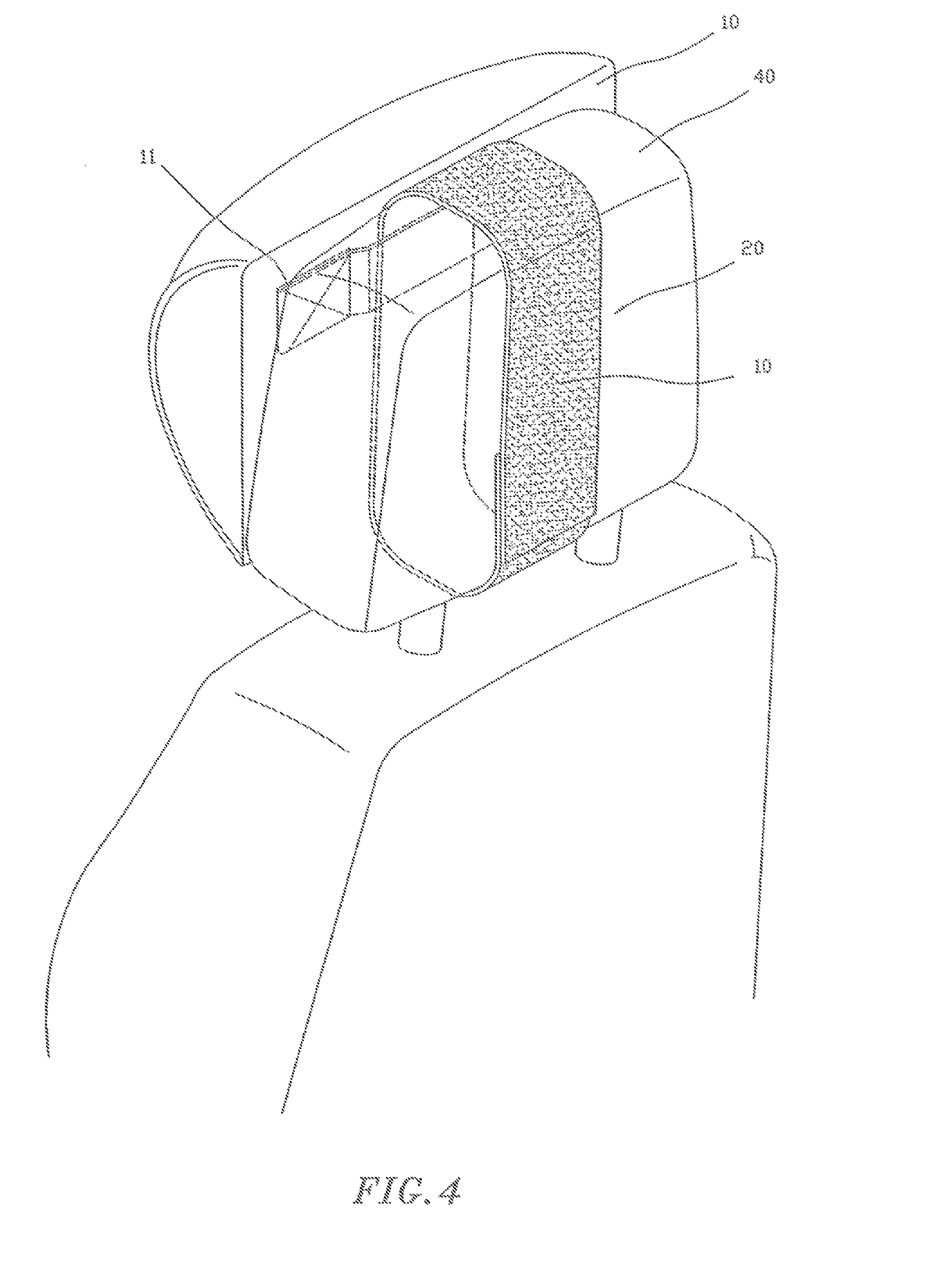
FIGS. 4-7 are schematic view of a multi-functional auxiliary headrest in accordance with the present invention.

Referring to FIG. 2, there is shown an auxiliary headrest 10 in accordance with the present invention. At the rear side of the auxiliary headrest 10 and in between the vertical edges of the auxiliary headrest 10, at least one suspension strap 11 is provided and one end of the suspension strap 11 is fastened to the auxiliary headrest 10 by stitching, and the other end is secured using a Velcro fastener. Beneath the suspension strap 11, a female Velcro fastener 30 is provided.

As shown in FIGS. 3 to 7, at least one securing strap 20 is passing through the suspension strap 11 and by means of male Velcro fastener 31, the securing strap 20 is adhered onto the female Velcro fastener 30 such that the suspension strap 11 is secured at the headrest portion 40 of the car or vehicle seat. The auxiliary headrest 10 can be moved or slide up and down along the securing strap 20, i.e., the adjustment of the auxiliary headrest 10 can be made freely without being secured at a fix position. The male Velcro fastener 31 mounted behind the securing strap 11 allows the mounting of the auxiliary headrest 10 after it has been adjusted at an appropriate position. Thus the auxiliary headrest 10 of the present invention is applicable to all users of different physical sizes.

Figure 8:
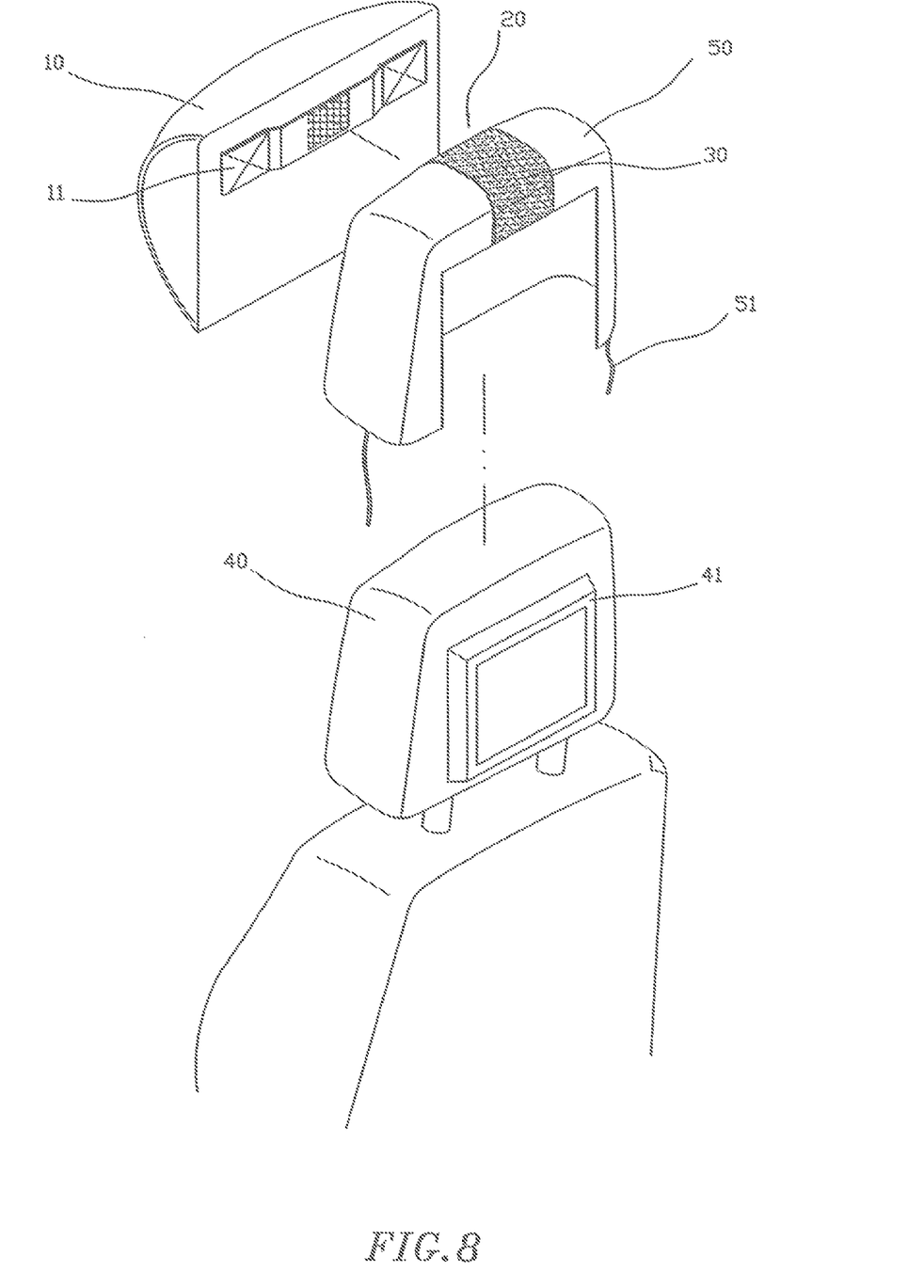
FIG. 8 is a perspective view of a multi-functional auxiliary headrest in accordance with the present invention.
Figure 9:
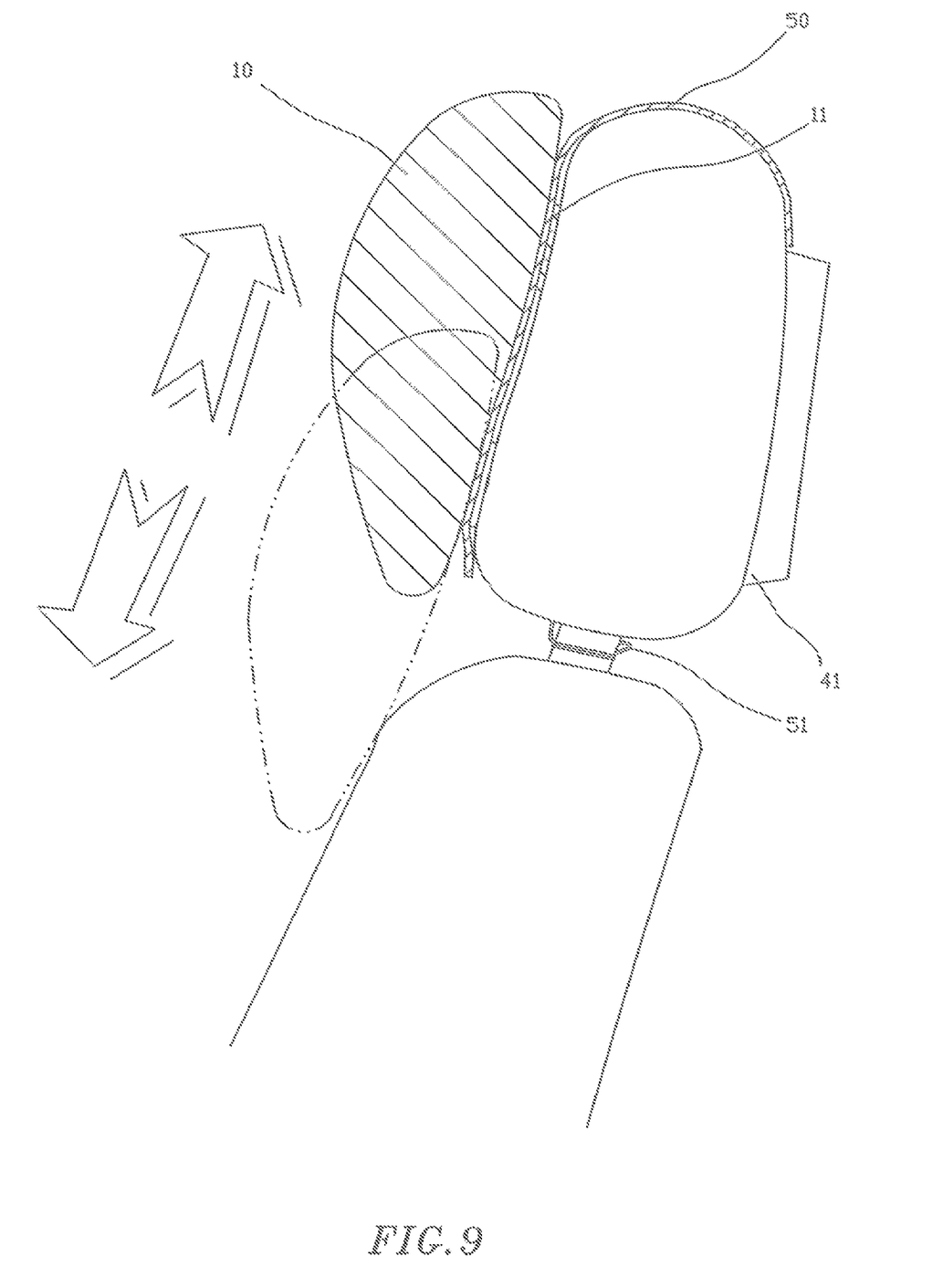
FIG. 9 is a schematic view of a multi-functional auxiliary headrest in accordance with the present invention.

Referring to FIGS. 8 and 9, the securing strap 20 cannot be used for headrest 50 of car seat having being mounted with a monitor 41. In order to allow the auxiliary headrest to be applicable in this headrest, the two ends of the securing strap 20 mounted with the female Velcro fastener 30 are stitched onto the headrest cover 50, and a rope 51 on the headrest cover 50 will secure the cover 50 to the headrest section 40 of the car seat. The lateral side of the suspension strap 11 of the auxiliary headrest 10 secures the securing strap 20 of the headrest cover 50 and the female Velcro fastener 30 at the back of the suspension strap 11 secures the auxiliary headrest 10 after it has been adjusted so that the auxiliary headrest 10 provides the user a comfortable position.

Figure 5:
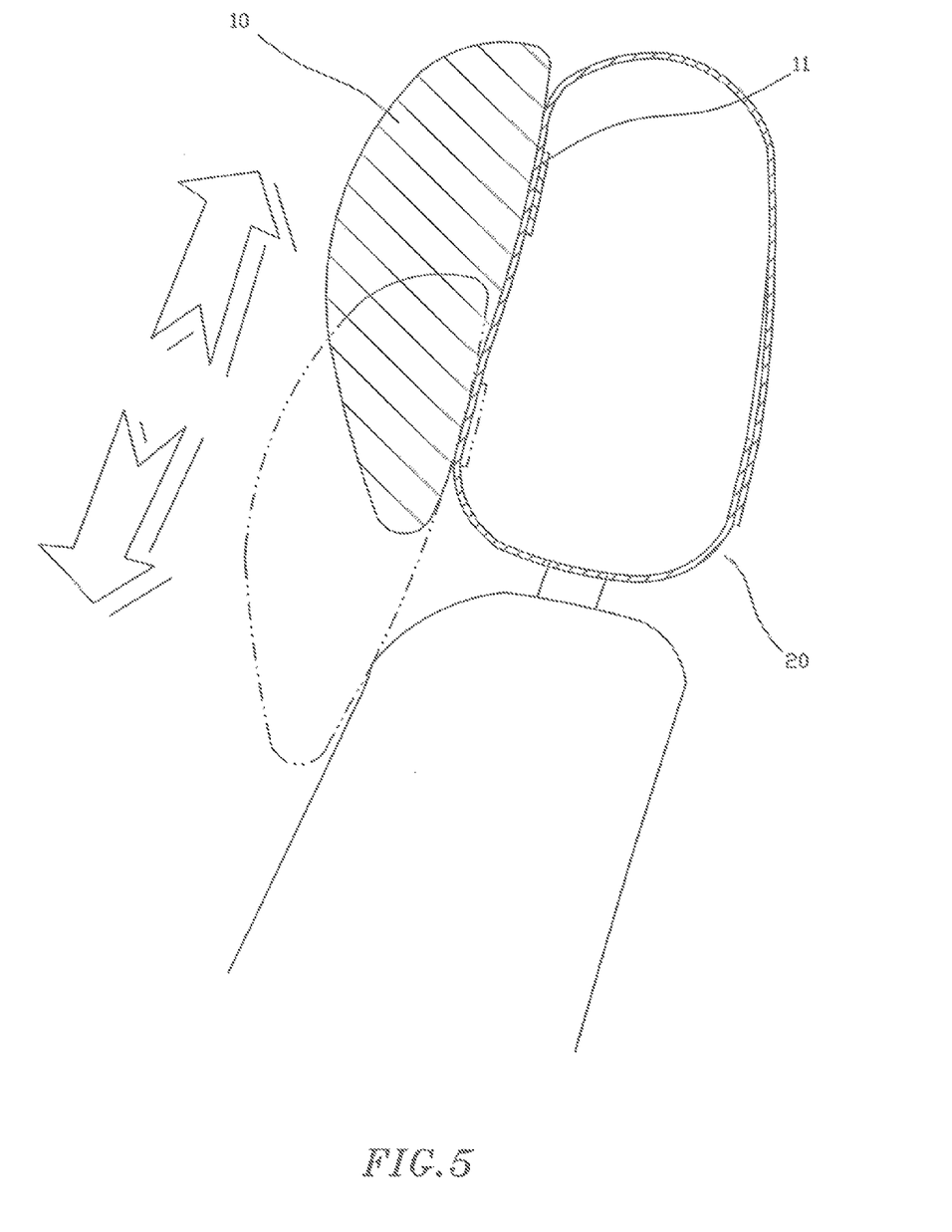
Figure 6:
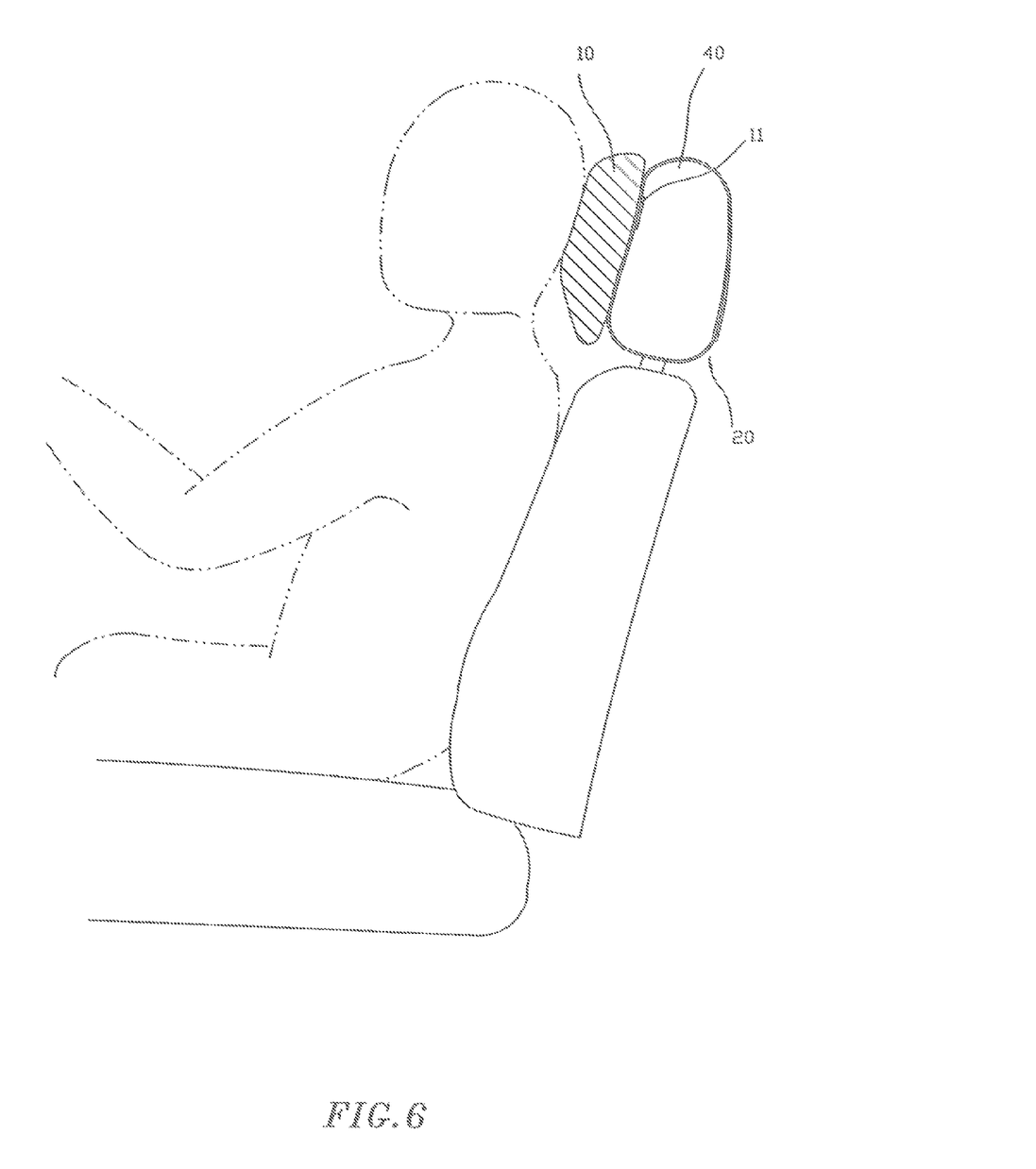
Figure 7:
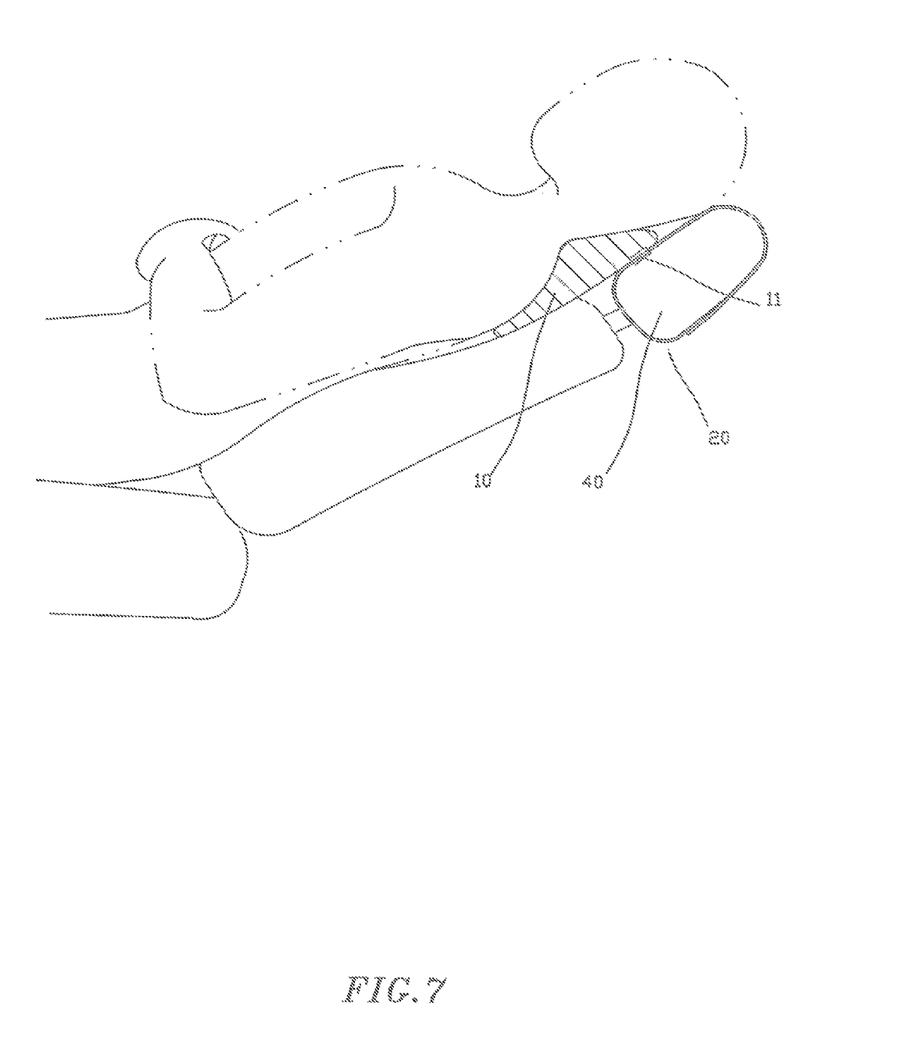
Figure 10:
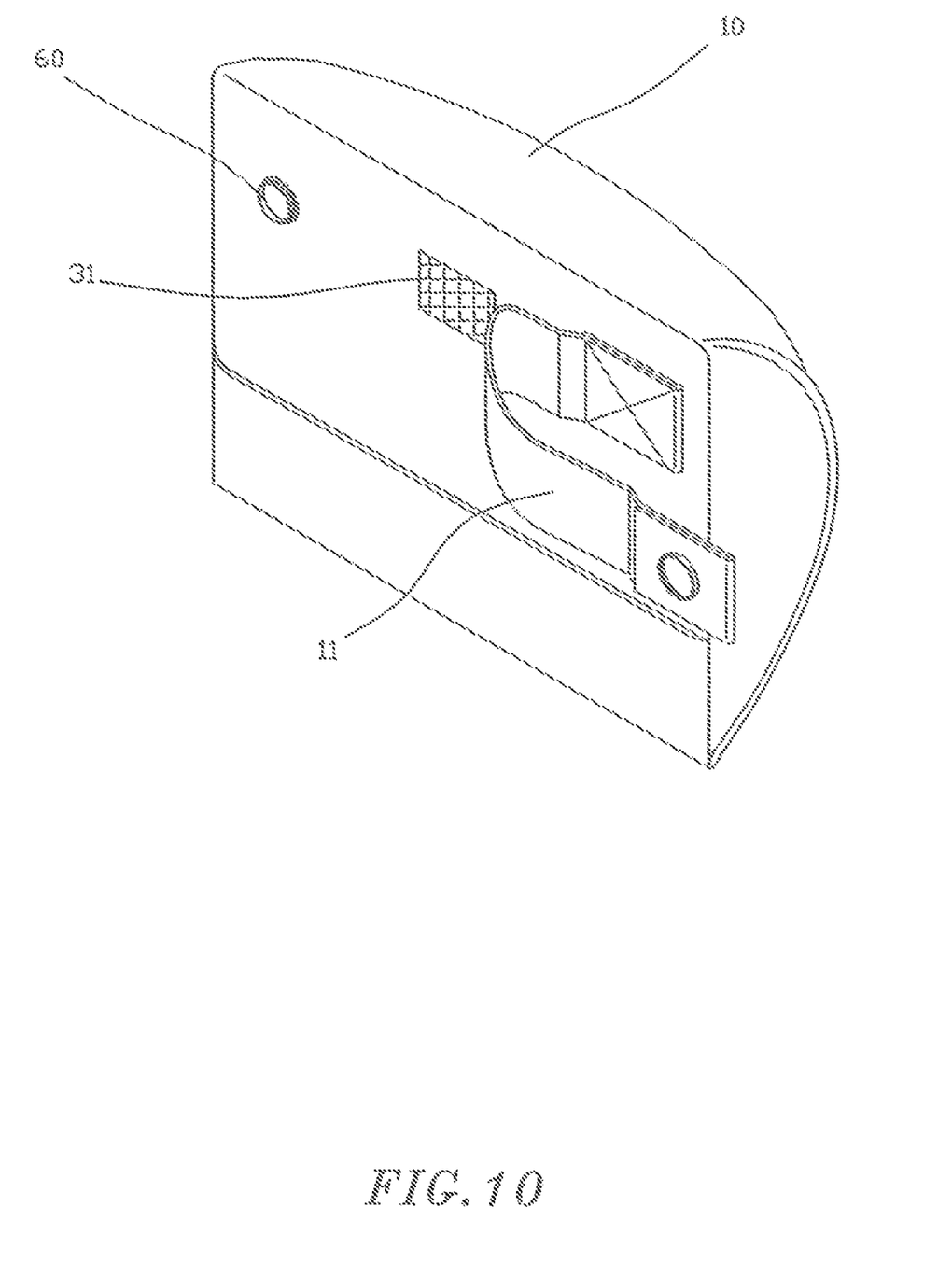
FIG. 10 is another perspective view of a multi-functional auxiliary headrest in accordance with the present invention.

In accordance with a preferred embodiment, when the suspension strap 11 is fixed at the upper edge of the auxiliary headrest 10, the auxiliary headrest 10 is allowed to freely slide along the securing strap 20. The height of the auxiliary headrest 10 can be adjusted and this can increase the entire distance of the auxiliary headrest 10 (as shown in FIGS. 5 and 9). Mounting by using male and female Velcro fastener (30,31) of the auxiliary headrest 10 can be replaced with button fastener 60 (as shown in FIG. 10) or the suspension strap 11 at the back of the auxiliary headrest 10 is removed but the female Velcro fastener 30 is retained for mounting. The stitching of the suspension strap 11 to the auxiliary headrest 10 can be replaced with a securing strap 20. If the auxiliary headrest 10 is to be used together with the headrest cover 50, the securing strap 20 is first mounted below the suspension strap 11, and the securing strap 20 is stitched to the headrest cover 50.

While the invention has been described with respect to preferred embodiment, it will be clear to those skilled in the art that modifications and improvements may be made to the invention without departing from the spirit and scope of the invention. Therefore, the invention is not to be limited by the specific illustrative embodiment, but only by the scope of the appended claims.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An auxiliary headrest comprising:
   a body having a rear side provided with at least a male hook-and-loop fastener;
   a suspension strap having a first end and a second end, said first end of said suspension strap being fastened to said rear side of said body by stitching at a position spaced from said male hook-and-loop fastener, said second end of said suspension strap being provided with a female hook-and-loop fastener adapted to engage with said male hook-and-loop fastener; and
   a securing strap passing between said body and said suspension strap and being adapted to secure to a headrest portion of a seat thereby enabling said auxiliary headrest to be adjusted along said headrest portion of said seat in stepless manner and adapted to be adjusted to a position below said headrest of said seat to cover a gap between said headrest of said seat and a backrest of said seat.

* * * * *